US010140066B2

(12) United States Patent
Gupta et al.

(10) Patent No.: US 10,140,066 B2
(45) Date of Patent: Nov. 27, 2018

(54) SMART PARTITIONING OF STORAGE ACCESS PATHS IN SHARED STORAGE SERVICES

(71) Applicant: International Business Machines Corporation, Armonk, NY (US)

(72) Inventors: Aayush Gupta, San Jose, CA (US); Dean Hildebrand, Bellingham, WA (US); Nagapramod S. Mandagere, San Jose, CA (US); Mohit Saxena, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 346 days.

(21) Appl. No.: 15/012,686

(22) Filed: Feb. 1, 2016

(65) Prior Publication Data
US 2017/0220281 A1 Aug. 3, 2017

(51) Int. Cl.
*G06F 3/06* (2006.01)

(52) U.S. Cl.
CPC ............ *G06F 3/067* (2013.01); *G06F 3/0604* (2013.01); *G06F 3/0613* (2013.01); *G06F 3/0635* (2013.01)

(58) Field of Classification Search
CPC ...... G06F 3/0629; G06F 3/067; G06F 3/0653; G06F 3/0604; G06F 3/0644
USPC ........................................ 709/226, 227, 232
See application file for complete search history.

(56) References Cited

U.S. PATENT DOCUMENTS

| | | | |
|---|---|---|---|
| 5,875,464 A | 2/1999 | Kirk | |
| 6,189,064 B1* | 2/2001 | MacInnis | G06T 9/00 345/440 |
| 7,051,188 B1 | 5/2006 | Kubala et al. | |
| 8,644,841 B1* | 2/2014 | Oroskar | H04W 28/08 455/442 |
| 9,007,189 B1* | 4/2015 | Curtis | A63F 13/798 340/323 R |
| 9,092,529 B1* | 7/2015 | Gyongyi | G06F 17/30554 |
| 9,669,315 B1* | 6/2017 | Curtis | A63F 13/798 |
| 2003/0061262 A1 | 3/2003 | Hahn et al. | |
| 2003/0144894 A1* | 7/2003 | Robertson | G06Q 10/06 709/226 |
| 2004/0117427 A1* | 6/2004 | Allen | H04N 21/21805 709/200 |
| 2004/0139433 A1* | 7/2004 | Blythe | G06F 9/505 718/100 |

(Continued)

OTHER PUBLICATIONS

Anonymous, "Domain Access control on Shared Storage Pool (SSP) devices," IP.com, May 24, 2013, pp. 1-3.

(Continued)

*Primary Examiner* — David R Lazaro
*Assistant Examiner* — Berhanu Shitayewoldetadik
(74) *Attorney, Agent, or Firm* — Zilka-Kotab, P.C.

(57) ABSTRACT

In one general embodiment, a computer-implemented method includes creating multiple pools of micro services. Each of the pools includes a specific configuration set and resource properties. Also, the computer-implemented method includes receiving incoming workloads. Moreover, the computer-implemented method includes, for each of the incoming workloads, dynamically mapping the incoming workload, based on characteristics of the incoming workload, to an access path traversing a combination of a subset of the pools of micro services.

20 Claims, 4 Drawing Sheets

(56) References Cited

U.S. PATENT DOCUMENTS

| | | | | |
|---|---|---|---|---|
| 2004/0139434 A1* | 7/2004 | Blythe | G06F 9/505 | 718/100 |
| 2005/0066241 A1* | 3/2005 | Gross | G05B 23/024 | 714/48 |
| 2006/0028501 A1* | 2/2006 | Silverbrook | B41J 2/2132 | 347/15 |
| 2006/0075129 A1* | 4/2006 | Geppert | G06Q 10/107 | 709/230 |
| 2007/0160126 A1* | 7/2007 | Van Der Meer | H04N 21/234327 | 375/240 |
| 2008/0270199 A1* | 10/2008 | Chess | G06F 9/505 | 705/7.26 |
| 2010/0235573 A1* | 9/2010 | Asano | G06F 3/0608 | 711/114 |
| 2011/0282727 A1* | 11/2011 | Phan | G06Q 10/10 | 705/14.36 |
| 2011/0296024 A1* | 12/2011 | Madani | G06F 9/5061 | 709/226 |
| 2014/0024340 A1* | 1/2014 | Raleigh | H04M 15/00 | 455/406 |
| 2014/0207944 A1* | 7/2014 | Emaru | H04L 47/803 | 709/224 |
| 2014/0325149 A1* | 10/2014 | Misra | G06F 3/0619 | 711/114 |
| 2015/0135160 A1* | 5/2015 | Gauvin | H04W 4/21 | 717/109 |
| 2015/0244804 A1* | 8/2015 | Warfield | H04L 47/6295 | 709/219 |
| 2015/0249707 A1* | 9/2015 | Morgan | H04L 12/6418 | 709/226 |
| 2015/0293823 A1* | 10/2015 | Bu | H04L 43/0817 | 714/4.11 |
| 2016/0112521 A1* | 4/2016 | Lawson | H04L 67/16 | 709/227 |
| 2016/0301742 A1* | 10/2016 | Lowery | H04L 67/10 | |
| 2017/0220281 A1* | 8/2017 | Gupta | G06F 3/0622 | |
| 2017/0223516 A1* | 8/2017 | Raleigh | H04W 4/008 | |
| 2017/0293994 A1* | 10/2017 | Li | G06T 1/20 | |

OTHER PUBLICATIONS

Anonymous, "Method and System for Assigning Storage Access Priorities to Input/output Intensive Host Applications in a Cloud Storage Network," IP.com, May 2, 2014, pp. 1-6.

\* cited by examiner

SMART PARTITIONING OF STORAGE ACCESS PATHS IN SHARED STORAGE SERVICES

BACKGROUND

The present invention relates to storage systems, and more specifically, this invention relates to partitioning access paths for shared storage services.

Distributed software-defined storage systems built on commodity hardware are quickly becoming the preferred choice for building large-scale storage services. Many of these systems are designed with the primary objectives of scalability and low cost. Object storage systems, such as OpenStack Swift, are designed as a set of loosely coupled micro services. Each micro service may be tasked with a specialized function, and designed for deployment on any physical topology. Scalability and fault tolerance is achieved by deploying multiple instances of each of the micro services, also known as horizontal scaling.

Typically, cloud storage providers configure and deploy all instances of a given micro service type identically, and load balancers are deployed in front of these instances to distribute the workloads. For instance, a Swift deployment may include tens of proxy services, each configured/deployed identically, with a round robin load balancer in front to distribute the workloads. In a shared storage cloud built using this model, all workloads may be treated equally with regard to the services they traverse. Tuning the configuration/resource allocation of the micro services to be optimized for all the different types of incoming workloads is difficult, if not impossible. Therefore, a one-size-fits-all approach is typically employed.

SUMMARY

In one general embodiment, a computer-implemented method includes creating multiple pools of micro services. Each of the pools includes a specific configuration set and resource properties. Also, the computer-implemented method includes receiving incoming workloads. Moreover, the computer-implemented method includes, for each of the incoming workloads, dynamically mapping the incoming workload, based on characteristics of the incoming workload, to an access path traversing a combination of a subset of the pools of micro services.

In another general embodiment, a computer program product is provided for partitioning storage access paths. The computer program product comprises a computer readable storage medium having program instructions embodied therewith. The program instructions are executable by one or more processors to cause the one or more processors to create multiple pools of micro services. Each of the pools includes a specific configuration set and resource properties. Also, the program instructions are executable by the one or more processors to cause the one or more processors to receive incoming workloads. Further, the program instructions are executable by the one or more processors to cause the one or more processors to, for each of the incoming workloads, dynamically map the incoming workload, based on characteristics of the incoming workload, to an access path traversing a combination of a subset of the pools of micro services.

In another general embodiment, a system is provided. The system includes multiple pools of micro services. Also, the system includes a load balancer. The load balancer includes a processor and logic integrated with and/or executable by the processor. The logic is configured to receive incoming workloads. Also, the logic is configured to, for each of the incoming workloads, dynamically map the incoming workload, based on characteristics of the incoming workload, to an access path traversing a combination of a subset of the pools of micro services.

Other aspects and embodiments of the present invention will become apparent from the following detailed description, which, when taken in conjunction with the drawings, illustrate by way of example the principles of the invention.

DETAILED DESCRIPTION

Figure 1:
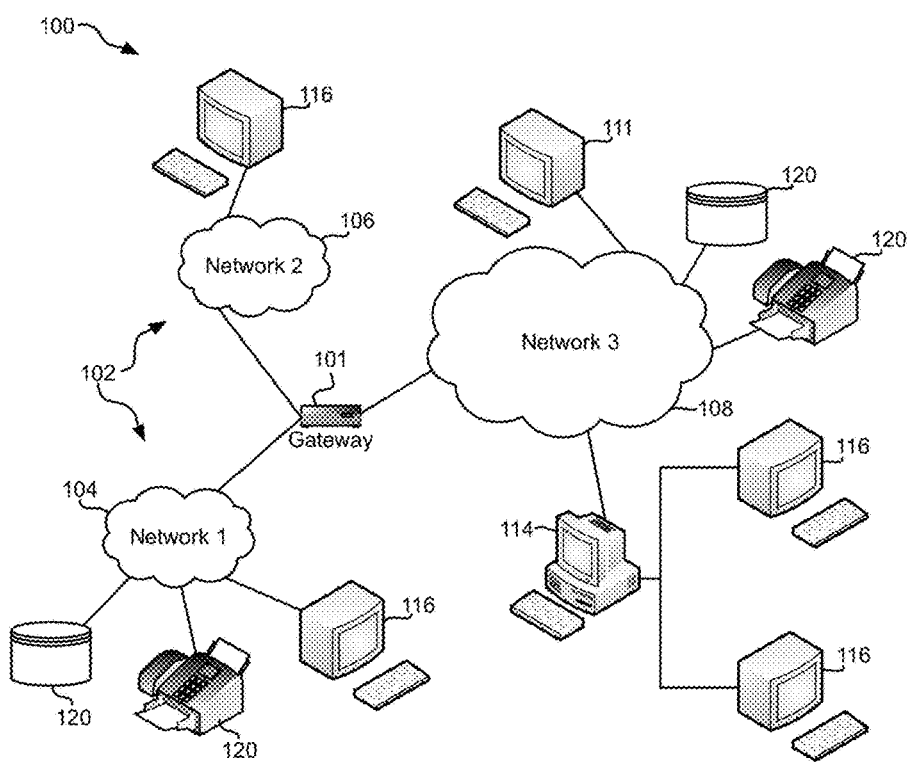
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for partitioning storage access paths in shared storage services.

In one general embodiment, a computer-implemented method includes creating multiple pools of micro services. Each of the pools includes a specific configuration set and resource properties. Also, the computer-implemented method includes receiving incoming workloads. Moreover, the computer-implemented method includes, for each of the incoming workloads, dynamically mapping the incoming workload, based on characteristics of the incoming workload, to an access path traversing a combination of a subset of the pools of micro services.

In another general embodiment, a computer program product is provided for partitioning storage access paths. The computer program product comprises a computer readable storage medium having program instructions embodied therewith. The program instructions are executable by one or more processors to cause the one or more processors to create multiple pools of micro services. Each of the pools includes a specific configuration set and resource properties. Also, the program instructions are executable by the one or more processors to cause the one or more processors to receive incoming workloads. Further, the program instructions are executable by the one or more processors to cause the one or more processors to, for each of the incoming workloads, dynamically map the incoming workload, based on characteristics of the incoming workload, to an access path traversing a combination of a subset of the pools of micro services.

In another general embodiment, a system is provided. The system includes multiple pools of micro services. Also, the system includes a load balancer. The load balancer includes a processor and logic integrated with and/or executable by the processor. The logic is configured to receive incoming workloads. Also, the logic is configured to, for each of the incoming workloads, dynamically map the incoming workload, based on characteristics of the incoming workload, to an access path traversing a combination of a subset of the pools of micro services.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
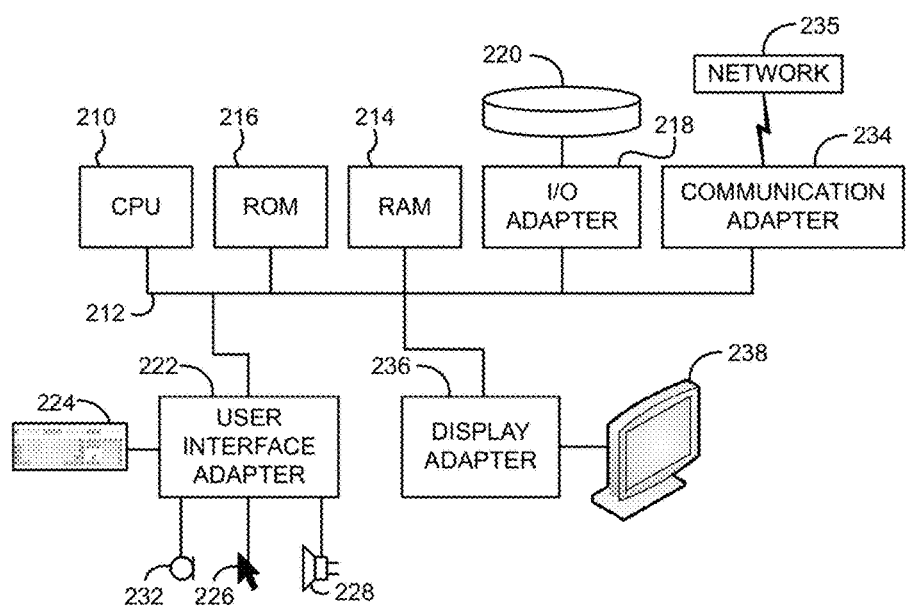
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
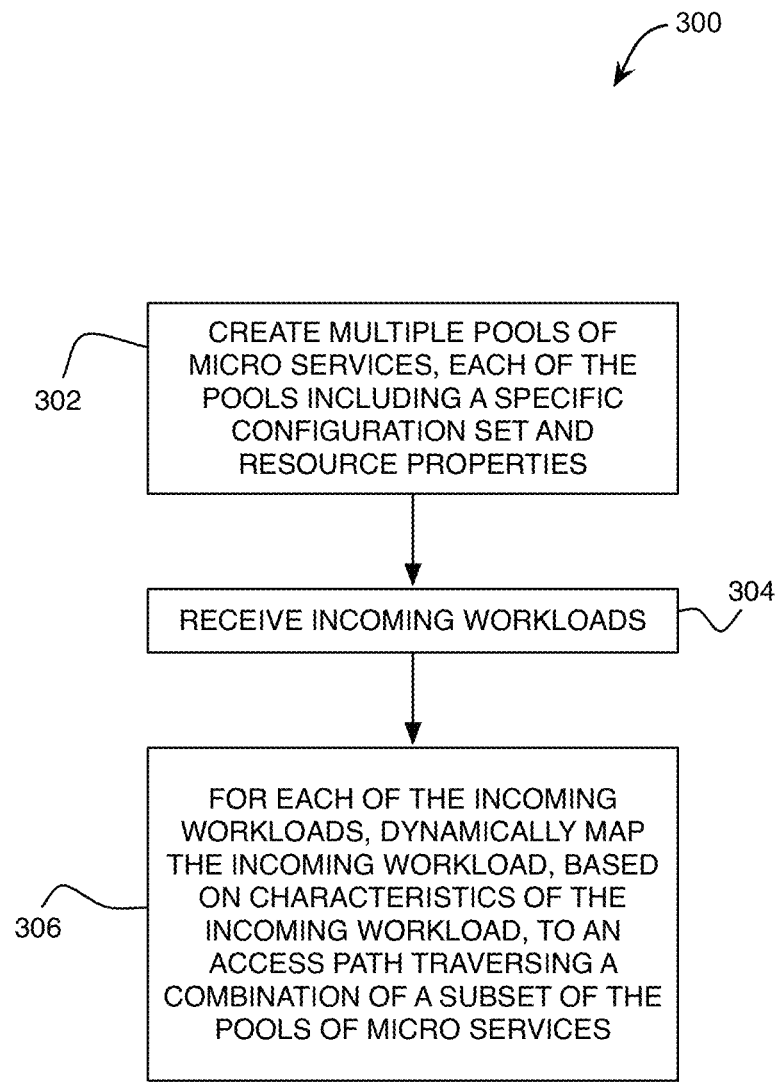
FIG. 3 illustrates a method for smart partitioning access paths in shared storage services, in accordance with one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a load balancer, a resource pool manager, or some other device(s) having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where multiple pools of micro services are created. As used herein, a micro service includes an independent process that communicates with other independent processes. The processes may communicate utilizing one or more Application Programming Interfaces (APIs), system busses, networks, etc. A plurality of micro services working together may, as a whole, operate as a more complex application or program. Further still, a pool of micro services comprises a homogenous grouping of one or more instances of a single micro service. For example, a pool of micro services may comprise two, eight, tens, hundreds, etc. simultaneously executing instances of a single micro service.

Additionally, at operation 304, incoming workloads are received. As used herein, a workload comprises a collection of one or more client requests. As an option, the workload may comprise one or more requests to read data, store data, modify data, etc. For example, a workload may include one or more requests to read an object from, or write an object to, an object-based storage system. Also, the workloads may be received over a network, such as the Internet.

Still yet, at operation 306, each of the incoming workloads is dynamically mapped to an access path. For each of the incoming workloads, the mapping is performed based on characteristics of the incoming workload. Each access path traverses a combination of a subset of the pools of micro services. In other words, two or more of the pools of micro services created at operation 302 may be combined to form a combination of a subset of the pools of micro services. Furthermore, one or more access paths may traverse the combination of the subset of the pools of micro services.

As used herein, an access path includes a vector of system resources utilized to access a unit of data. The unit of a data may include, for example, an object. In one embodiment, an access path may include a network configuration (e.g., nodes, addresses, etc.), bandwidth (e.g., 1 Mb/s, 10 Mb/s, 1 Gb/s, etc.), a number of CPUs (e.g., 1 CPU, 2 CPUs, 4 CPUs, etc.), CPU speed (e.g., 500 MHz, 2 GHz, etc.), memory (e.g., 500 MB, 1 GB, 4 GB, etc.), a tier of storage (e.g., solid state disk (SSD), hard disk drive (HDD), tape, etc.), a quantity of storage (e.g., 5 GB, 100 GB, 1 TB, etc.), a file system (e.g., distributed file system, such as gluster or GPFS, local file system, such as ext 4, etc.), cache access, etc. In particular, the system resources of a given access path originate from the pools of micro services traversed by the access path. In other words, the system resources of a micro service pool may be reserved for access paths that traverse the micro service pool. In this way, a workload mapped to an access path may utilize the system resources of the combination of micro service pools traversed by the access path. Additionally, each of the access paths traversing a given combination of pools of micro services may be identical, such that each of the access paths includes the same vector of system resources.

Accordingly, a workload that is mapped to an access path utilizes the system resources of the combination of pools of micro services comprising the access path to which the workload is mapped. As an option, the mapping of a workload to an access path may be performed based on the specific configuration set and resource properties of the pools of micro services comprising the access path.

By allowing such high granularity with respect to the customization of the system resources in the access paths, significant configuration diversity may be realized, thereby allowing for access paths that are highly optimized with respect to the workloads that are mapped to the access paths. The configuration diversity may be utilized to complement the diversity between different workloads. For example, some workloads will include only requests for small objects, where the requested objects are only a few bytes or kilobytes in size, while other workloads will include requests for large objects that are gigabytes in size, such as virtual machine images, videos, etc.

The availability of a large amount of CPU resources to proxy services may be critical for serving small-object workloads comprising hundreds or thousands of different requests. Conversely, CPU resources may be less important than network bandwidth for a workload comprising a single request for a very large object. Moreover, with respect to storage resources, SSDs may be beneficial for read-intensive workloads that request many smaller objects, whereas a backup, which spans gigabytes of storage and is expected to be read infrequently, may be stored on a slower HDD. Still yet, real-time interactive workloads (e.g., hbase, etc.) are latency sensitive, whereas asynchronous workloads may not be sensitive to higher latencies. As another example, the databases for workloads with a large number of metadata operations may be maintained on faster storage media (e.g., SSD, etc.), and may benefit from in-memory caching. Similarly, various small object read-intensive workloads may also benefit from in-memory data caching.

As used herein, the characteristics of a workload may include any measurable aspect of the workload. For example, the characteristics of the workload may include a size of the requests comprising the workload, a bandwidth required (e.g., a minimum bandwidth, average bandwidth, etc.) to satisfy the requests comprising the workload, and/or a latency (e.g., a maximum latency, average latency, etc.) required to satisfy the requests comprising the workload. Moreover, the characteristics of a workload may include a historical performance of the workload. Accordingly, the dynamic mapping of an incoming workload may be performed based on the historical performance of the incoming workload.

In one embodiment, the characteristics of a workload may be defined expressly by the entity from which the workload is received. For example, the entity originating a workload may specify that the workload requires a maximum latency of 20 milliseconds. As another example, the entity originating a workload may specify that the workload requires a minimum network speed of 16 Mb/s. The characteristics may be defined by an application, a client, a user, etc. from which the workload is received. In other words, in such an embodiment, the characteristics of a workload may be determined based on information expressly provided by the entity from which the workload is received.

In another embodiment, the characteristics of a workload may be determined by monitoring a request associated with the workload. For example, if the workload includes a plurality of requests coming from a particular application, then the characteristics of the workload may be determined based on the application. As an option, workload rules or policies may be established for different applications. As another example, the characteristics of the workload may be determined based on the address or identity of the entity originating the workload. As yet another example, the requests of a workload may be monitored and then categorized. As an option, the requests may be categorized based on pre-defined classifications or categories. Moreover, based on the categorization of the requests, the workload may thereby be classified.

Still yet, the mapping of a workload includes any operation that selects an access path for use in servicing the workload. The mapping may be performed in a manner that holistically optimizes the workloads being serviced. For example, an access path selected to service a given workload may be selected in a manner that ensures, based on the characteristics of the workload, that any service requirements associated with the workload are satisfied. Further, an access path selected to service a given workload may be selected in a manner that ensures the system resources of the pools of micro services comprising the access path are not unused or otherwise wasted. Additionally, the mapping is performed dynamically, such that the workloads are mapped as they are received.

As an option, the dynamic mapping of an incoming workload may be further performed based on a current system load. In other words, the mapping of an incoming workload to an access path may be affected by a pre-existing system wide load, such as, for example, processing or bandwidth constraints due to pre-existing workloads.

In one embodiment, after mapping the workloads to the access paths, the workloads may be monitored. As an option, monitoring a workload may include ascertaining a workload's usage of the system resources in the micro service pools being utilized to service the workload. For example, by monitoring a workload, it may be determined that a micro service pool to which the workload is mapped has an abundance of unused system resources due to inefficient resource utilization. Still yet, the pools of micro services may be reconfigured based on the monitoring of the workloads. Reconfiguring the pools of the micro services may include any operation that modifies the system resources made available to at least one pool of micro services. In this way, a pool that is determined to include unused system resources may be reconfigured such that less unused system resources exist within the pool, and system resources previously unused within the pool may be allocated to another pool of micro services.

Over time, the characteristics of the incoming workloads may change. For example, the workloads may evolve from including many discrete transactions involving small objects to a lesser number of transactions involving objects that are greater in size. As another example, new clients may generate workloads that are dissimilar from the workloads previously mapped. As a result, the storage pools of micro services may be reconfigured in real-time based on a feedback mechanism, such as, for example, load monitoring. Reconfiguring the storage pools includes any operation that changes the configuration set and resource properties of a workload. This may include adding access paths or removing access paths from a system.

In one embodiment, at least one combination of a subset of the pools of micro services provides object access to an object-based client. For example, as described in more detail below, a workload associated with an object-based client may include an HTTP GET request. The workload may be assigned to an access path that traverses some combination of pools of micro services. Further, the access path is utilized to service the GET request.

Moreover, the at least one combination of the subset of the pools of micro services providing the object access may include pools of micro services from two or more different service layers. In other words, the pools of micro services that are combined to form an access path may originate from two or more different service layers. For example, and as described in more detail below, the at least one combination of the subset of the pools of micro services providing the object access may include a proxy service pool at a first service layer, a container service pool at a second service layer, and an object service pool at a third service layer.

In particular, the proxy service pool may determine how to handle requests of a workload, and move data in response to the requests. As an option, the proxy service pool may utilize a lookup table, logical ring, hash ring, hash, etc. Also, the access path may include a container service pool for managing and/or accessing the contents of a container. Still yet, the access path may include an object service pool for accessing and/or managing objects stored in containers. Accordingly, the access path may traverse three different service layers.

In one embodiment, the specific configuration set and resource properties for at least one of the pools of micro services is configured for latency-sensitive workloads. Moreover, a latency-sensitive access path may be created by configuring an access path that traverses a combination of the pools of micro services that have been configured for latency-sensitive workloads. Still yet, the specific configuration set and resource properties for other pools of micro services may be configured for throughput-sensitive workloads. Further, a throughput-sensitive access path may be created by configuring an access path that traverses a combination of the pools of micro services that have been configured for throughput-sensitive workloads.

In other words, a first access path that traverses throughput-sensitive micro service pools at various service layers may be configured for servicing workloads that are relatively latency insensitive, but require large bandwidth network pipes (e.g., 100 Mb/s) in order to timely respond to sizeable object requests; and a second access path that traverses latency-sensitive micro service pools at the same service layers may be configured for servicing workloads that are latency sensitive (e.g., <10 ms), but comprise requests for smaller objects (e.g., object size<1 MB). As a result, an incoming latency insensitive workload may be mapped to the first access path, while an incoming latency sensitive workload may be mapped to the second access path. In this way, a system's total capacity may remain constant over time, but micro service pools within the system are configured to ensure that the system serves the workloads in an efficient manner.

Figure 4:
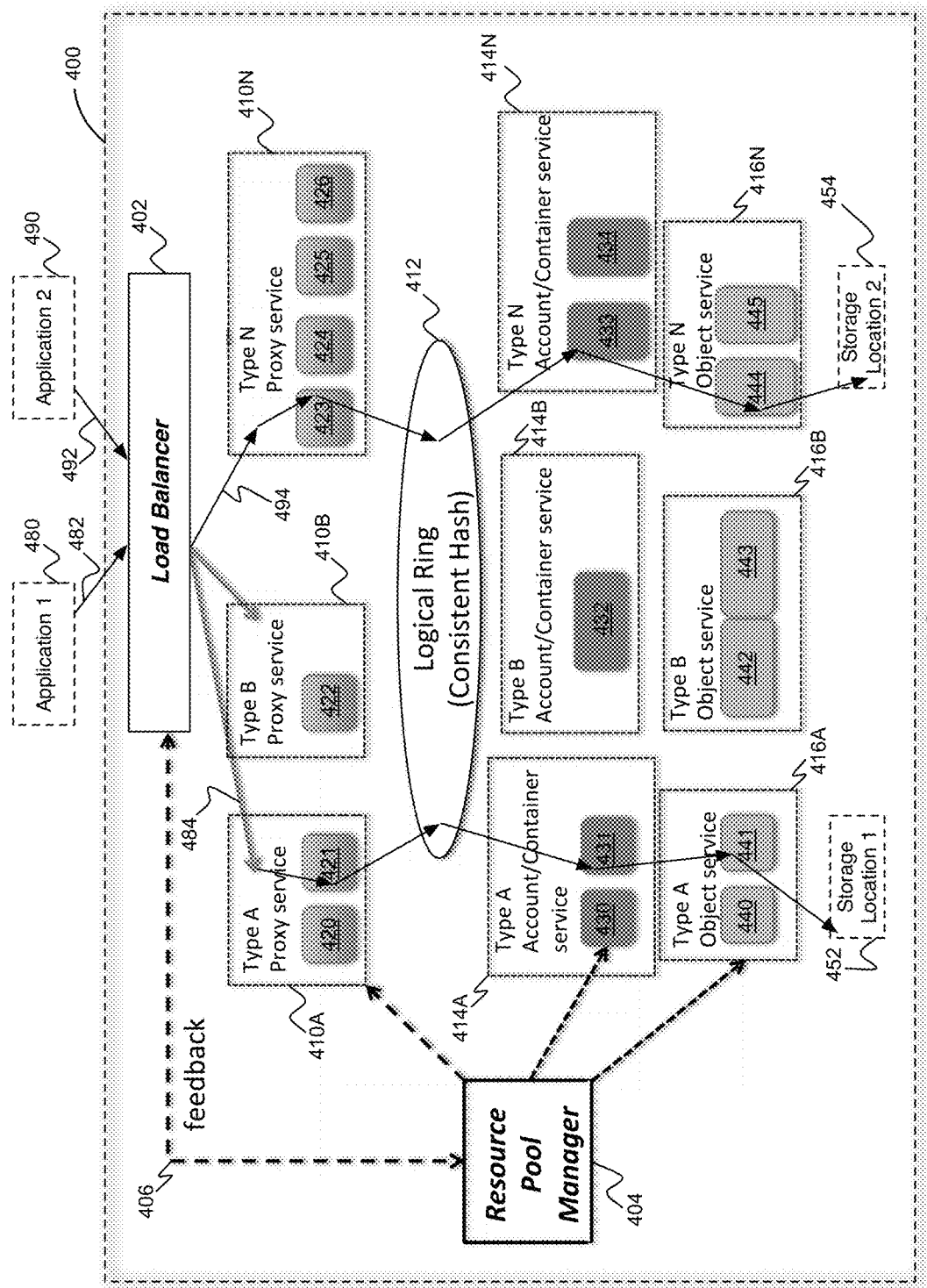
FIG. 4 illustrates a system for smart partitioning access paths in shared storage services, in accordance with one embodiment.

FIG. 4 depicts a system 400 for partitioning storage access paths in shared storage services, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

As shown, the system 400 includes a load balancer 402 in communication with a resource pool manager 404. The load balancer 402 and/or the resource pool manager 404 may be implemented on the data servers described within the context of FIG. 1. Moreover, the system 400 includes proxy service pools 410 (i.e., including type A proxy service pool 410A, type B proxy service pool 410B, and type N proxy service pool 410N), logical ring 412, account/container service pools 414 (i.e., including type A account/container service pool 414A, type B account/container service pool 414B, and type N account/container service pool 414N), and object service pools 416 (i.e., including type A object service pool 416A, type B object service pool 416B, and type N object service pool 416N). The system 400 is also shown to include multiple storage locations. In particular, the system 400 is shown to include a first storage location 452, and a second storage location 454. Accordingly, in one embodiment, the system 400 may comprise a storage system, such as an object storage system.

As illustrated in FIG. 4, the proxy service pools 410 are shown configured at a first service layer, the account/container service pools 414 are shown configured at a second service layer, and object service pools 416 are shown configured at a third service layer. A given access path may be configured to traverse a combination of a subset of the pools of micro services shown included in the system 400 of FIG. 4. For example, a first access path may be configured to traverse the type N proxy service pool 410N, the type B account/container service pool 414B, and the type A object service pool 416A, while a second access path is configured to traverse the type B proxy service pool 410B, the type A account/container service pool 414A, and the type B object service pool 416B.

Still yet, each of the pools of micro services is shown to include a specific configuration set and resource properties. For example, the type A proxy service pool 410A is shown to include two instances (i.e., instances 420 and 421) of a type A proxy service. Moreover, the type A account/container service pool 414A is shown to include two instances (i.e., instances 430 and 431) of a type A account/container service. Also, the type A object service pool 416A is shown to include two instances (i.e., instances 440 and 441) of a type A object service.

Similarly, the type B proxy service pool 410B is shown to include one instance (i.e., instance 422) of a type B proxy service. Moreover, the type B account/container service pool 414B is shown to include one instance (i.e., instance 432) of a type B account/container service. Also, the type B object service pool 416B is shown to include two instances (i.e., instances 442 and 443) of a type B object service.

Still yet, the type N proxy service pool 410N is shown to include four instances (i.e., instances 423, 424, 425, and 426) of a type N proxy service. Moreover, the type N account/container service pool 414N is shown to include two instances (i.e., instances 433 and 434) of a type N account/container service. Also, the type N object service pool 416N is shown to include two instances (i.e., instances 444 and 445) of a type N object service.

Each service instance of the proxy service instances 420-426, account/container service instances 430-434, and object service instances 440-445 may comprise a single micro service.

In one embodiment, the system resources available in a given micro service pool may be controlled by the number of instances of a micro service that are assigned to the pool. Moreover, the resource pool manager 404 may start micro services, and assign or partition the micro services to the pools. In this way, the resource pool manager 404 may determine which instances of the micro services should work together in a single pool, and create the pools of micro services. Further, the partitioning of micro services/resources into the pools by the resource pool manager 404 creates various distinguishable micro configurations/access paths that are optimized to specific subset of workloads. This partitioning not only enables tailored optimizations, but also helps minimize interference between the workloads.

The resource pool manager 404 may perform analytics, such as determining a state of the pools of the system 400. As an option, the state of the pools of the system 400 may be determined in the context of end-to-end access paths, and not just at a local service level, to determine whether some pools are over provisioned or under provisioned. The resource pool manager 404 may add system resources to a pool or remove system resources from a pool based on the analytics. In various embodiments, the resource pool manager 404 may configure the logical ring 412 utilizing its knowledge of the micro service pools. In other words, the resource pool manager 404 may configure the logical ring 412 such that workloads are mapped or diverted, starting at the proxy service pools 410, into one or more other particular pools.

For example, the resource pool manager 404 may recognize that a particular type of workload should be mapped to a combination of: the type A proxy service pool 410A, the type A account/container service pool 414A, and the type A object service pool 416A. Accordingly, the load balancer 402 may be configured by the resource pool manager 404 such that when a workload of the particular type is received, the load balancer 402 passes the requests of the workload to the type A proxy service pool 410A. Further, the logical ring 412 may be configured by the resource pool manager 404 such that any request serviced by the type A proxy service pool 410A is mapped to a particular access path that traverses the type A account/container service pool 414A and the type A object service pool 416A. In other words, the resource pool manager 404 configures the load balancer 402 and the logical ring 412 such that requests of the specific workload utilize only an access path that traverses the type A proxy service pool 410A, the account/container service pool 414A, and the object service pool 416A. By maintaining the single logical ring 412 (i.e., logical consistent hashing ring/namespace), as found in other prior art systems, application and/or client disruption may be avoided.

In operation, workloads are received from applications at the load balancer 402. In response to receiving a workload, the load balancer 402 maps the incoming workload to an appropriate access path based on end-to-end heuristics and workload suitability. In other words, the load balancer 402 maps an incoming workload to an appropriate access path based on end-to-end resource/configuration topology, the existing allocation of access paths, and workload suitability.

As illustrated in FIG. 4, the load balancer 402 is shown to receive a first workload 482 from a first application 480. Similarly, the load balancer 402 is shown to receive a second workload 492 from a second application 490. Each of the applications 480 and 490 may comprise any process external to the load balancer 402 capable of providing service requests to the load balancer 402. Accordingly, the workloads 482 and 492 may be received from the applications 480 and 490, respectively, over a network, such as the Internet. For example, the applications 480 and 490 may comprise applications executing on computers remote (e.g., user devices 111 and/or 116 described in the context of FIG. 1, etc.) from the load balancer 402, such as backup applications, storage applications, retrieval applications, etc.

Based upon a prior configuration of the load balancer 402 by the resource pool manager 404, the load balancer 402 dynamically maps the first workload 482 to a first access path 484. The mapping of the first workload 482 to the first access path 484 may be based on explicit commands from the first application 480 that characterize the first workload 482, based upon an analysis and characterization of the first workload 482 by the load balancer 402, based upon a historical performance of the first workload 482, and/or based on a load on the system 400. Accordingly, the first workload 482 may be dynamically mapped to the first access path 484 based on characteristics of the first workload 482. The first access path 484 traverses a specific subset of the pools of micro services of the system 400. In particular, the first access path 484 traverses the type A proxy service pool 410A, the type A account/container service pool 414A, and the type A object service pool 416A. As an option, the load balancer 402 may be pre-configured to associate characteristics of the first workload 482 with the configuration set and resource properties of the pools of micro services included in the first access path 484.

Similarly, based upon a prior configuration of the load balancer 402 by the resource pool manager 404, the load balancer 402 dynamically maps the second workload 492 to a second access path 494. The mapping of the second workload 492 to the second access path 494 may be based on explicit commands from the second application 490 that characterize the second workload 492, based upon an analysis and characterization of the second workload 492 by the load balancer 402, based upon a historical performance of the second workload 492, and/or based on a load on system 400. Accordingly, the second workload 492 may be dynamically mapped to the second access path 494 based on characteristics of the second workload 492. The second access path 494 traverses a specific subset of the pools of micro services of the system 400. In particular, the second access path 494 traverses the type N proxy service pool 410N, the type N account/container service pool 414N, and the type N object service pool 416N. As an option, the load balancer 402 may be pre-configured to associate characteristics of the second workload 492 with the configuration set and resource properties of the pools of micro services included in the second access path 494.

Based on the mapping of the first workload 482 to the first access path 484, the load balancer 402 provides the first workload 482 to the type A proxy service pool 410A. In particular, the first workload 482 is received by the instance 421 of the type A proxy service pool 410A, which then performs a lookup in the logical ring 412 to determine where the workload 482 should be forwarded within the system 400. Based on the lookup in the logical ring 412, the first workload 482 is provided to the instance 431 of the type A account/container service pool 414A, which provides the workload 482 to the instance 441 of the type A object service pool 416A. Moreover, the instance 441 of the type A object service pool 416A directs the workload to a first storage location 452 for satisfying a request (e.g., storage operation, retrieval operation, modification operation, etc.) of the first workload 482.

Similarly, based on the mapping of the second workload 492 to the second access path 494, the load balancer 402 provides the second workload 492 to the type N proxy service pool 410N. In particular, the second workload 492 is received by the instance 423 of the type N proxy service pool 410N, which then performs a lookup in the logical ring 412 to determine where the workload 492 should be forwarded within the system 400. Based on the lookup in the logical ring 412, the second workload 492 is provided to the instance 433 of the type N account/container service pool 414N, which provides the second workload 492 to the instance 444 of the type N object service pool 416N. Moreover, the instance 444 of the type N object service pool 416N directs the workload to a second storage location 454 for satisfying a request (e.g., storage operation, retrieval operation, modification operation, etc.) of the second workload 492.

The mapping of the first workload 482 and the second workload 492 to different access paths may be due to the characteristics of the respective workloads. For example, the first workload 482 may include hundreds or thousands of object GET requests, where each of the object GET requests is for an object that is no larger than 10 MB in size. Accordingly, the instance 421 of the type A proxy service pool 410A may be assigned for use many different hardware processors, making it well suited for rapidly performing a lookup in the logical ring 412 for each of the object GET requests. Further, the access path 484 may be provisioned with a network bandwidth of up to 1 Gb/s, which is more than adequate for timely serving the relatively small objects targeted by the first workload 482. Still yet, the type A object service pool 416A retrieves the objects targeted by the workload 482 from the first storage location 452, which may be mapped to one or more SSDs, for facilitating rapid retrieval of many small objects.

In contrast, the second workload 492 may include just one or two object GET requests, where each of the object GET requests is for an object that is over 5 GB in size. Accordingly, the instance 423 of the type N proxy service pool 410N may be assigned for use a single hardware processor, which is all that may be needed to timely perform infrequent lookups in the logical ring 412. Further, the access path 494 may be provisioned with a network bandwidth of up to 10 Gb/s, in order to rapidly serve the relatively large objects targeted by the second workload 492. Still yet, the type N object service pool 416N retrieves the objects targeted by the workload 492 from the second storage location 454, which may be mapped to one or more HDDs, which provide an ideal cost/performance relationship for the storage and retrieval of very large objects.

In a prior art system, the transfer of large objects for a workload may saturate network resources. If a subsequently received workload requests access to numerous small objects, and the small objects targeted by the subsequently received workload are to be served utilizing the same pool of resources as those being used to transfer the large objects, the latency of the later workload may be negatively impacted. In other words, the small objects may be not be located and transferred until completing the transfer of the larger objects. At the same time, a CPU workload associated with proxy services would lie idle as the request for the large objects is serviced, thereby wasting CPU resources. Through use of the different pools of micro services of the system 400, optimal resource utilization may be achieved.

In some embodiments, a given workload may be eligible for mapping to more than one access path. For example, in the context of the system 400 of FIG. 4, the workload 482 from the first application 480 may also be eligible for mapping to another access path (not shown). In other words, both this other access path (not shown) and the first access path 484 may satisfy a required service level of the workload 482. In such embodiments, the load balancer 402 may determine which access path is used based on workloads already distributed to the access paths, or the pools comprising the access paths, thereby ensuring that workloads are not asymmetrically distributed to a single pool.

In one embodiment, the different layers/services may be modeled as nodes of a graph. For example, each proxy service instance, account service instance, object service instance, etc. may be modeled as a node in a graph. In such an embodiment, workloads may be mapped to edges of the graph. For example, an edge connecting two given nodes of the graph may be mapped to a workload. As an option, the workloads mapped to a given edge in the graph may determine a weight of the edge. Moreover, within a graph model, a set of services may be freed by relocating the edge connecting the two services. For example, the workload that is mapped to the edge may be assigned to a different set of services by moving the edge in the graph model.

The resource pool manager 404 may optimize resources across the pools based on real-time monitoring of the services in the pools, and/or feedback 406 from the load balancer 402. For example, feedback 406 transmitted between the load balancer 402 and the resource pool manager 404 may be utilized to adjust the micro service pools and map workloads. As an option, the feedback 406 from the load balancer 402 may include recommendations for resource pool optimizations. As an option, the resource pool manager 404 may track the latency of workload responses by monitoring the time between receiving a workload at the load balancer 402 or a proxy service pool 410, and when the requests in the workload are satisfied. Further, a pool of micro services may be associated with a pre-determined latency threshold. If at any time the latency of workloads passing through the pool of micro services exceeds the pre-determined latency threshold for the pool, then additional system resources may be assigned to the pool, or a new pool of micro services may be created.

The feedback 406 may be utilized by the resource pool manager 404 to configure the pools, or to reconfigure the pools after monitoring the workloads mapped to the access paths. In other words, the resource pool manager 404 may monitor system resource usage by workloads assigned to the access paths comprised of the micro service pools. The resource pool manager 404 may reconfigure the pools of micro services by re-assigning a service instance from a first pool to a second pool. For example, if the resource pool manager 404 recognizes that, over time, a first pool needs additional instances of a proxy service, then the resource pool manager 404 may identify a free or unused instance of the proxy service that is assigned to a second pool, and assign the unused instance of the proxy service to the first pool. Additionally, the load balancer 402 may utilize the feedback 406 from the resource pool manager 404 for mapping the workloads to the access paths.

The load balancer 402 may be embodied on a combination of hardware and software. Further, the resource pool manager 404 may be embodied on a combination of hardware and software. As an option, the load balancer 402 and the resource pool manager 404 may exist as different software modules executing on the same hardware. As another option, the load balancer 402 may execute on hardware different than the hardware that the resource pool manager 404 is executing on. Accordingly, the feedback 406 may be communicated over a system bus, over a network, etc. Still yet, the system 400 may be configured to include multiple instances of the load balancer 402 and/or the resource pool manager 404.

As described above, the system 400 may provide end-to-end resource and performance isolation in an object-storage system through logical and/or physical partitioning of different layers of an object storage system. Specifically, by way of the resource pool manager 404 and the load balancer 402, shared storage and network services of the system 400 may be partitioned and mapped to workloads based on the requirements of the workloads. The load balancer 402 and resource pool manager 404 work in coordination to dynamically manage resource pools throughout the life cycles of the pools.

Each of the partitions may be defined as a combination of hardware and software configuration attributes of all dependent micro services, rather than just hardware resource attributes. This helps tailor a single underlying platform for a variety of different workload requirements, while achieving isolation, co-location, and anti-colocation. Moreover, the resource pools are more than just a collection of hardware resources, but are instead a combination of hardware and software configurations of services collectively over a cluster. Additionally, system resources may be rebalanced based on changing workload characteristics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    creating multiple pools of micro services, where:
        each of the micro services includes an independent process within a storage system,
        each of the multiple pools of micro services includes a homogenous grouping of a plurality of instances of a single micro service, and
        each of the multiple pools of micro services has associated resources of the storage system available to the pool of micro services;
    receiving a workload, the workload including a plurality of requests to access data within the storage system;
    dynamically mapping the workload, based on characteristics of the workload, to an access path traversing a combination of a subset of the pools of micro services, where the access path includes a vector of resources of the storage system utilized to access the data, and the workload utilizes the resources of the storage system associated with the combination of the subset of the pools of micro services;
    monitoring the workload after mapping the workload to the access path, including determining a usage of the resources of the storage system associated with the combination of the subset of the pools of micro services; and
    reconfiguring the multiple pools of micro services, including modifying the resources of the storage system available to one or more of the multiple pools of micro services, based on the monitoring.

2. The computer-implemented method of claim 1, wherein the characteristics of the workload include:
    a size of the plurality of requests comprising the workload,
    a bandwidth required to satisfy the plurality of requests comprising the workload,
    a latency required to satisfy the plurality of requests comprising the workload, and
    a historical performance of the workload.

3. The computer-implemented method of claim 1, wherein the access path includes:
a network configuration utilized to access the data,
an amount of network bandwidth utilized to access the data,
a number of CPUs utilized to access the data,
a CPU speed utilized to access the data,
an amount of memory utilized to access the data,
a tier of storage utilized to access the data,
a quantity of storage utilized to access the data, and
a file system type utilized to access the data.

4. The computer-implemented method of claim 1, wherein the combination of the subset of the pools of micro services includes pools of micro services from a plurality of different service layers, including:
a proxy service pool at a first service layer that determines how to handle the plurality of requests of the workload, and move data in response to the plurality of requests,
a container service pool at a second service layer for managing and accessing contents of a container, and
an object service pool at a third service layer for accessing and managing objects stored in the container.

5. The computer-implemented method of claim 1, wherein the resources of the storage system associated with the combination of the subset of the pools of micro services are reserved for the access path traversing the combination of the subset of the pools of micro services.

6. The computer-implemented method of claim 1, wherein the characteristics of the workload are determined based on an application from which one or more of the plurality of requests originate.

7. The computer-implemented method of claim 1, wherein the characteristics of the workload are determined based on an address or identity of an entity originating the workload.

8. The computer-implemented method of claim 1, wherein dynamically mapping the workload is further based on a current load of the storage system, including processing or bandwidth constraints due to pre-existing workloads.

9. The computer-implemented method of claim 1, wherein the resources of the storage system available in each of the multiple pools of micro services are controlled by a number of instances of the single micro service that are assigned to the pool of micro services.

10. The computer-implemented method of claim 1, further comprising providing the workload to each of the subset of the pools of micro services, based on the mapping of the workload to the access path traversing the combination of the subset of the pools of micro services.

11. A computer program product for partitioning storage access paths, the computer program product comprising a computer readable storage medium having program instructions embodied therewith, wherein the computer readable storage medium is not a transitory signal per se, the program instructions executable by one or more processors to cause the one or more processors to:
create, by the one or more processors, multiple pools of micro services, where:
each of the micro services includes an independent process within a storage system,
each of the multiple pools of micro services includes a homogenous grouping of a plurality of instances of a single micro service, and
each of the multiple pools of micro services has associated resources of the storage system available to the pool of micro services;
receive, by the one or more processors, a workload, the workload including a plurality of requests to access data within the storage system;
dynamically map, by the one or more processors, the workload, based on characteristics of the workload, to an access path traversing a combination of a subset of the pools of micro services, where the access path includes a vector of resources of the storage system utilized to access the data, and the workload utilizes the resources of the storage system associated with the combination of the subset of the pools of micro services;
monitor, by the one or more processors, the workload after mapping the workload to the access path, including determining a usage of the resources of the storage system associated with the combination of the subset of the pools of micro services; and
reconfigure, by the one or more processors, the multiple pools of micro services, including modifying the resources of the storage system available to one or more of the multiple pools of micro services, based on the monitoring.

12. The computer program product of claim 11, wherein the characteristics of the workload include:
a size of the plurality of requests comprising the workload,
a bandwidth required to satisfy the plurality of requests comprising the workload,
a latency required to satisfy the plurality of requests comprising the workload, and a historical performance of the workload.

13. The computer program product of claim 11, wherein the access path includes:
a network configuration utilized to access the data,
an amount of network bandwidth utilized to access the data,
a number of CPUs utilized to access the data,
a CPU speed utilized to access the data,
an amount of memory utilized to access the data,
a tier of storage utilized to access the data,
a quantity of storage utilized to access the data, and
a file system type utilized to access the data.

14. The computer program product of claim 11, wherein at least one combination of a subset of the pools of micro services provides object access to an object-based client, wherein the at least one combination of the subset of the pools of micro services providing the object access includes pools of micro services from two or more different service layers.

15. The computer program product of claim 14, wherein the at least one combination of the subset of the pools of micro services providing the object access includes a proxy service pool at a first service layer, a container service pool at a second service layer, and an object service pool at a third service layer.

16. The computer program product of claim 11, wherein one of combination of a subset of the pools of micro services is configured for latency-sensitive workloads.

17. The computer program product of claim 16, wherein another of the combinations of a subset of the pools of micro services is configured for throughput-sensitive workloads.

18. A system, comprising:
a processor; and
logic integrated with the processor, executable by the processor, or integrated with and executable by the processor, the logic being configured to:
create multiple pools of micro services, where:
each of the micro services includes an independent process within a storage system, each of the multiple pools of micro services includes a homogenous grouping of a plurality of instances of a single micro service, and each of the multiple pools of micro services has associated resources of the storage system available to the pool of micro services;

receive a workload, the workload including a plurality of requests to access data within the storage system;

dynamically map the workload, based on characteristics of the workload, to an access path traversing a combination of a subset of the pools of micro services, where the access path includes a vector of resources of the storage system utilized to access the data, and the workload utilizes the resources of the storage system associated with the combination of the subset of the pools of micro services;

monitor the workload after mapping the workload to the access path, including determining a usage of the resources of the storage system associated with the combination of the subset of the pools of micro services; and reconfigure the multiple pools of micro services, including modifying the resources of the storage system available to one or more of the multiple pools of micro services, based on the monitoring.

19. The system of claim 18, wherein the characteristics of the workload include:
   a size of the plurality of requests comprising the workload,
   a bandwidth required to satisfy the plurality of requests comprising the workload,
   a latency required to satisfy the plurality of requests comprising the workload, and
   a historical performance of the workload.

20. The system of claim 18, wherein the access path includes:
   a network configuration utilized to access the data,
   an amount of network bandwidth utilized to access the data,
   a number of CPUs utilized to access the data,
   a CPU speed utilized to access the data,
   an amount of memory utilized to access the data,
   a tier of storage utilized to access the data,
   a quantity of storage utilized to access the data, and
   a file system type utilized to access the data.

* * * * *